United States Patent
Warneke et al.

(10) Patent No.: US 11,895,588 B2
(45) Date of Patent: Feb. 6, 2024

(54) TIMING PRECISION MAINTENANCE WITH REDUCED POWER DURING SYSTEM SLEEP

(71) Applicant: Analog Devices, Inc., Wilmington, MA (US)

(72) Inventors: Brett Warneke, Castro Valley, CA (US); Gary Wayne Ng, Campbell, CA (US); Mark Alan Lemkin, Berkeley, CA (US)

(73) Assignee: Analog Devices, Inc., Wilmington, MA (US)

( * ) Notice: Subject to any disclaimer, the term of this patent is extended or adjusted under 35 U.S.C. 154(b) by 196 days.

(21) Appl. No.: 17/385,536

(22) Filed: Jul. 26, 2021

(65) Prior Publication Data

US 2022/0046538 A1 Feb. 10, 2022

Related U.S. Application Data

(60) Provisional application No. 63/061,370, filed on Aug. 5, 2020.

(51) Int. Cl.
*H04W 52/02* (2009.01)
*H04J 3/06* (2006.01)
*H04W 56/00* (2009.01)

(52) U.S. Cl.
CPC ....... *H04W 52/0229* (2013.01); *H04J 3/0667* (2013.01); *H04W 56/001* (2013.01)

(58) Field of Classification Search
CPC ........... H04W 56/001; H04W 56/0035; H04W 52/022; Y02D 10/00; Y02D 30/70; G06F 1/14; G06F 1/32; G06F 1/3287
See application file for complete search history.

(56) References Cited

U.S. PATENT DOCUMENTS

| 5,579,353 A | 11/1996 | Parmenter et al. |
| 5,758,132 A | 5/1998 | Straahlin |

(Continued)

FOREIGN PATENT DOCUMENTS

| CN | 101782791 B | 8/2011 |
| CN | 116134400 A | 5/2023 |

(Continued)

OTHER PUBLICATIONS

"International Application Serial No. PCT/US2021/043509, International Search Report dated Oct. 22, 2021", 3 pgs.

(Continued)

*Primary Examiner* — Chi H Pham
*Assistant Examiner* — Vladislav Y Agureyev
(74) *Attorney, Agent, or Firm* — Schwegman Lundberg & Woessner, P.A.

(57) ABSTRACT

Embodiments of the present disclosure provide systems and methods for maintaining timing precision in different operating modes of a device (e.g., a wireless node). A timing circuit may switch clock signals between two different modes (e.g., high power and low power) while preserving timing precision. In a high-power mode, the timing circuit may provide a high frequency clock signal, and in a lower-power mode, it may provide a low frequency clock signal. Moreover, the switching between the different clock signals may be synchronized to select edges of the low frequency clock signal.

16 Claims, 5 Drawing Sheets

(56) References Cited

U.S. PATENT DOCUMENTS

| | | | |
|---|---|---|---|
| 6,163,583 | A | 12/2000 | Lin et al. |
| 6,442,271 | B1 | 8/2002 | Tuttle et al. |
| 6,466,073 | B1 | 10/2002 | Yukinari et al. |
| 6,483,888 | B1 | 11/2002 | Boerstler et al. |
| 6,943,639 | B2 | 9/2005 | Dahlin |
| 7,656,245 | B2 | 2/2010 | Mccorquodale et al. |
| 8,943,352 | B1 | 1/2015 | Warneke |
| 9,112,448 | B2 | 8/2015 | Terrovitis |
| 2005/0007205 | A1 | 1/2005 | Bridger |
| 2007/0079201 | A1 | 4/2007 | Chung |
| 2009/0201057 | A1 | 8/2009 | Pendurkar |
| 2009/0284534 | A1 | 11/2009 | Hendry et al. |
| 2012/0098609 | A1 | 4/2012 | Verma et al. |
| 2012/0293269 | A1 | 11/2012 | Mcdonald et al. |
| 2013/0015893 | A1* | 1/2013 | Severson ............... H03K 23/66 327/151 |
| 2015/0241905 | A1* | 8/2015 | Pessa ..................... G06F 1/08 713/502 |
| 2016/0066280 | A1* | 3/2016 | Heo ................. H04W 52/0287 455/574 |
| 2016/0109901 | A1* | 4/2016 | Sheafor ................ G06F 1/3287 713/400 |
| 2016/0269034 | A1* | 9/2016 | Winemiller ............... G06F 1/12 |
| 2016/0282921 | A1 | 9/2016 | Kodavalla |
| 2017/0090536 | A1 | 3/2017 | Schreiner et al. |
| 2018/0136706 | A1* | 5/2018 | Wiencke ............... G06F 11/349 |
| 2018/0246557 | A1* | 8/2018 | John ..................... G06F 1/3206 |
| 2018/0284878 | A1* | 10/2018 | Artieri ................. H03K 5/1565 |
| 2019/0041946 | A1* | 2/2019 | Wallichs ................... G06F 1/08 |
| 2019/0050020 | A1* | 2/2019 | Chu ......................... G06F 1/10 |
| 2019/0253810 | A1* | 8/2019 | Pawlowski ............. H04R 3/06 |
| 2019/0341803 | A1* | 11/2019 | Cook ..................... H03K 3/037 |
| 2023/0276367 | A1* | 8/2023 | Heo ..................... G06F 1/3296 455/574 |

FOREIGN PATENT DOCUMENTS

| | | |
|---|---|---|
| EP | 0421431 A2 | 4/1991 |
| WO | WO-2022031496 A1 | 2/2022 |

OTHER PUBLICATIONS

"International Application Serial No. PCT/US2021/043509, Written Opinion dated Oct. 22, 2021", 5 pgs.

"International Application Serial No. PCT/US2021/043509, International Preliminary Report on Patentability dated Feb. 16, 2023", 7 pgs.

* cited by examiner

TIMING PRECISION MAINTENANCE WITH REDUCED POWER DURING SYSTEM SLEEP

CLAIMS OF PRIORITY

This patent application claims the benefit, of priority U.S. Provisional Patent Application Ser. No. 63/061,370, titled "TIMING PRECISION MAINTENANCE WITH REDUCED POWER DURING SYSTEM SLEEP," filed on Aug. 5, 2020, which is hereby incorporated by reference herein in its entirety.

TECHNICAL FIELD

The present disclosure generally relates to timing switch circuits for maintaining timing precision in different power modes.

BACKGROUND

The world is getting more connected every day. For example, the Internet of Things (IOT) can connect various devices (e.g., appliances, speakers, etc.) to the Internet so that, among other things, they can be controlled remotely. Wireless nodes can be embedded with the devices to connect those devices to a wireless network. The devices can therefore communicate using the wireless nodes and the wireless network.

Furthermore, the wireless nodes, because of their size and location, can be powered by batteries. To conserve power and extend battery life, the wireless nodes can reduce their power consumption by operating in a low-power mode (e.g., sleep mode) when not in active communication. For example, the wireless nodes can wake up from sleep mode and enter active mode to perform communications (e.g., transmit and/or receive data) using synchronized or coordinated communication protocols, where the wireless nodes communicate at specified times. That is, the wireless nodes can wake up at specified times for communications and then re-enter sleep mode to conserve power. But timing in the wireless nodes can drift while in sleep mode, impacting the reliability of such communications. Clock drift can also lead to other issues, such as precisely scheduling activities, accurately taking timestamps, etc. Moreover, compensating drift can require operating in active mode longer, diminishing the benefits of operating in sleep mode.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments of the present disclosure provide systems and methods for maintaining timing precision in different operating modes of a device. For example, a timing circuit may be provided in the device, which may switch clock signals between different modes (e.g., a relatively higher power consumption mode and a relatively lower power consumption mode as compared to the higher power consumption mode) while preserving timing precision across such modes. In some embodiments, a ratio of digital logic power consumption in higher power consumption modes is more than 2× the power consumption in low power mode. In a high-power mode, the timing circuit may provide a high frequency clock signal, and in a lower-power mode, it may provide a low frequency clock signal. The low frequency clock signal may be synthesized from the high frequency clock signal, so the high and low frequency clock signals may be substantially synchronized. Moreover, the switching between the different clock signals may be synchronized to select edges of a designated clock. This switching scheme may maintain frequency stability and accuracy. Furthermore, the timing circuit may drive a system time counter, which switches time base depending on the modes to maintain timing precision for use with, for example, coordinated or synchronized communication protocols.

Figure 1:
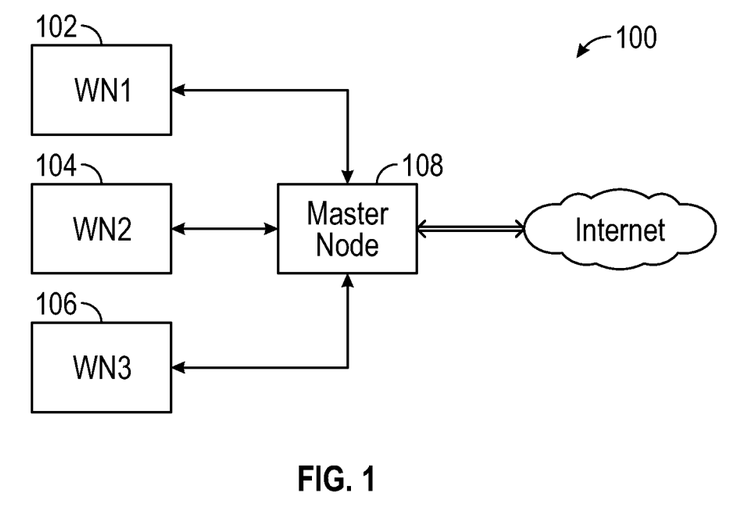
FIG. 1 illustrates a wireless communication network.

FIG. 1 illustrates an example of portions of a wireless communication network 100. The wireless communication network 100 may include a plurality of wireless nodes 102, 104, 106 and a master node 108. The wireless nodes 102, 104, 106 may be communicatively coupled to the master node 108, which in turn may be coupled to the internet. The wireless nodes 102, 104, 106 may communicate with the master node based on a communication protocol. The communication protocol may be for short-range wireless communications or long-range wireless communications. For short-range wireless communications, the protocol may include Bluetooth (e.g., Low Energy Bluetooth), Zigbee, IrDa or another suitable protocol.

The wireless nodes 102, 104, 106 may be coupled to or embedded in various devices, such as sensors, appliances, lighting systems, speakers, and so forth. The wireless nodes 102, 104, 106 may transmit and/or receive data to/from the master node 108. The master node 108 may send control information to wireless nodes 102, 104, 106. The wireless nodes 102, 104, 106 may send data (e.g., measurement or status data) to the master node 108. Communications between the wireless nodes 102, 104, 106 and the master node 108 may be coordinated based on the communication protocol (e.g., a synchronized, contention-less network). That is, the master controller 108 may send data to the wireless nodes 102, 104, 106 at specified times, and the wireless nodes 102, 104, 106 may send data to the master node 108 at other specified times. Thus, the timing between the wireless nodes 102, 104, 106 and the master node 108 may be synchronized based on the communication protocol used by the network. In some embodiments, the wireless nodes 102, 104, 106 may communicate with each other or may connect directly to the internet (e.g., master node may be optional). The wireless network 100 may be provided as different types, such as a star network, multi-hop mesh network, and other known network types.

Figure 2:
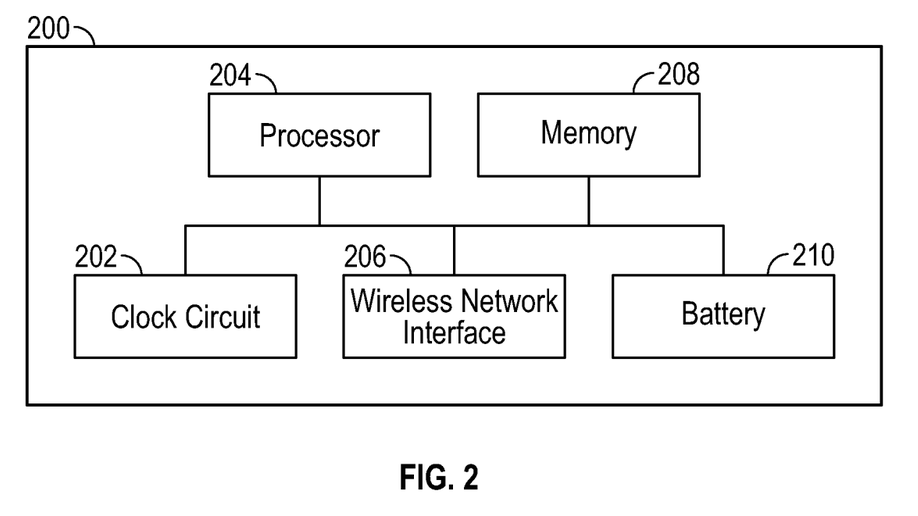
FIG. 2 illustrates a wireless node.

FIG. 2 illustrates an example of portions of a wireless node 200. The wireless node 200 may include a clock circuit 202, a processor 204, a wireless network interface 206, a memory 208, and a power source 210. The wireless node 200 may operate in different power or operating modes. For example, the wireless node 200 may operate in a high-power mode (e.g., wake or active mode) and one or more low-power modes (e.g., sleep, hibernation, etc.). The clock circuit 202 may generate different clock signals to be used in the different power modes. As explained in further detail below, the clock circuit 202 may generate a high frequency clock signal to be used in the high-power mode and one or more low frequency clock signals to be used in the low-power mode(s). The processor 204 may be coupled to the memory 208 and may execute instructions stored in the memory 208 to perform operations. The processor 204 may operate in the different power modes.

The wireless network interface 206 may include radio frequency (RF) circuits to provide wireless communication. The wireless network interface 206 may communicate with other devices, such as the master device, using a coordinated communication protocol, as described herein. The wireless network interface 206 may operate in different modes, as described herein. For example, the wireless network interface 206 may be powered down or put in sleep mode during low-power mode(s) and powered on for full operation during the high-power mode.

The power source 210 may be provided as a battery, a capacitor, an energy harvesting device, or other suitable power supplies. The power source 210 may supply power to other components in the wireless node 200. For example, the power source 210 may be provided as a lithium cell battery. The charge of the power source 210 may drain more power when the wireless node 200 is operating in the high-power mode as compared to the low-power mode(s). Thus, the charge of power source 210 may be extended by operating in low-power mode(s).

Figure 3:
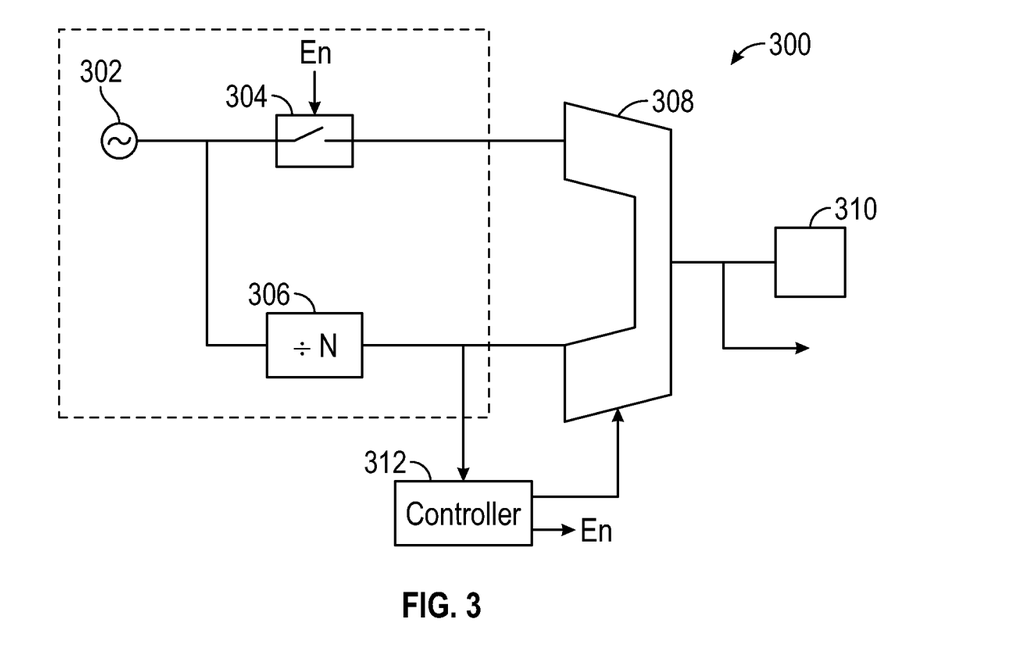
FIG. 3 illustrates a clock switching circuit.

FIG. 3 illustrates an example of portions of a clock switching circuit 300. The clock switching circuit 300 may include an oscillator 302, a clock gate 304, a clock divider 306, a multiplexor 308, a system time counter 310, and a controller 312. The oscillator 302 may generate a high frequency clock signal. The oscillator 302 may be provided as a crystal oscillator. For example, the oscillator 302 may generate a ~40 MHz clock signal. The oscillator 302 may consume low power while generating the high frequency clock signal. As described below, the high frequency clock signal may be generated in both high- and low-power modes. The oscillator 302 may be part of a reference clock generator.

The clock gate 304 may receive the high frequency clock signal and may provide the high frequency clock signal to the multiplexor 308, responsive to an enable signal. For example, when the enable signal is high, the clock gate 304 may provide the high frequency clock signal to the multiplexor 308. But when the enable signal is low, the clock gate 304 may block the high frequency clock signal from the multiplexor 308. As described in further detail below, the clock gate 304 may provide the high frequency clock signal to the multiplexor 308 during high-power mode and may disable or block it during low-power mode(s), except for a short period of time preceding a transition from a low-power mode to a high-power mode. The clock gate 304 may be provided spatially close to the crystal oscillator 302 to minimize wiring parasitic that may consume power (as shown using dashed lines in FIG. 3).

The clock divider 306 may also receive the high frequency clock signal and may divide or scale the high frequency clock signal by an integer (e.g., 400) to generate a low frequency clock signal (e.g., 100 kHz). The clock divider 306 may generate a low frequency clock signal that is substantially synchronous with corresponding edges of the high frequency clock signal, except for possibly a slight delay (e.g., 2-4 nanoseconds) due to the delay inherent in the circuitry of the clock divider 306. The clock divider 306 may also be provided spatially close to the crystal oscillator 302 to minimize wiring parasitic that may consume power. In an embodiment described in further detail below (e.g., FIG. 6), the clock divider 306 may include a plurality of dividers for generating a plurality of low frequency clock signals to be used in a plurality of different low-power modes. A ripple divider may be provided as a low-power component, and ripple dividers may naturally divide by binary ratios. This binary high/low relationship may allow counter segmentation based on binary subsections.

The multiplexor 308 (also sometimes referred to as clock switching block) may receive the high frequency clock signal (e.g., from clock gate 304) and the low frequency clock signal (e.g., from clock divider 306). The multiplexor 308 may output either the high frequency clock signal during high-power mode or the low frequency clock signal during low-power mode to the system time counter 310 and other components. The system time counter 310 may maintain a system time that is to be used by a timer-scheduler, for example, for coordinated communications as described herein. During high-power mode, the multiplexor 308 may provide the high frequency clock signal, and the system time counter 310 may use the high frequency clock to maintain the system time. During low-power mode, the multiplexor 308 may provide the low frequency clock signal, and the system time counter 310 may use the low frequency clock to maintain the system time. Low-power mode may correspond to a sleep mode. The system time counter 310 may also count by a different base depending on the power mode. For example, with the use of a "16" integer divider, the system time count may be counted 16*25 ns every low flow frequency clock during low-power mode and it may be counted by 25 ns every high frequency clock during high-power mode. The system time may be used to schedule activities such as sampling a sensor or input pin, toggling an output pin, triggering an actuator, triggering a sequence of operations, etc.

The controller 312 may control the switching of the multiplexor 308 in a synchronized fashion to maintain timing precision. During a transition from a high-power mode to a low-power mode, the controller 312 may switch the output of the multiplexor 308 from the high frequency clock signal to the low frequency clock signal synchronized to the next specified edge of the low frequency clock. The specified edge for transition synchronization may be selected to be either a rising or falling edge. Hence, if a rising edge is selected, the controller 312 may wait until the next specified rising edge of the low frequency clock signal for the clock-signal switch to maintain precision of the system time. The next specified rising edge may be the subsequent rising edge, or the controller 312 may bypass one or more cycles for the next specified rising edge. Likewise, during a transition from a low-power mode to a high-power mode, the controller 312 may switch the output of the multiplexor 308 from the low frequency clock signal to the high frequency clock signal synchronized to the next specified edge of the low frequency clock. Again, if a rising edge is selected, the controller 312 may wait until the next specified rising edge of the low frequency clock signal for the clock-signal switch to maintain precision of the system time. The next specified rising edge may be the subsequent rising edge, or the controller 312 may bypass one or more cycles for the next specified rising edge. The controller 312 may be provided as a digital logic circuit.

Figure 4:
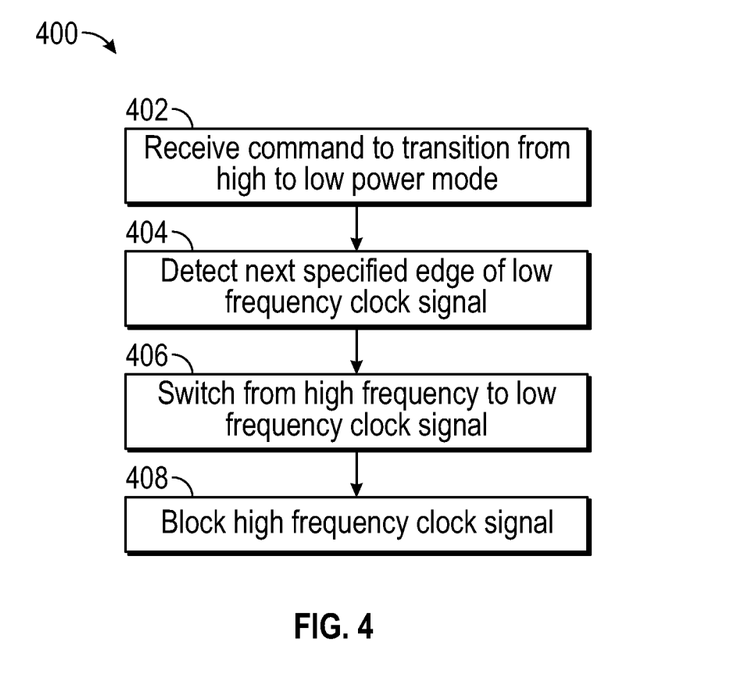
FIG. 4 is a flow diagram for transitioning from high-power mode to low-power mode.

FIG. 4 illustrates a flow diagram of an example of portions of a method 400 for transitioning from a high-power mode to a low-power mode. The method 400 may be executed by the clock circuit 300, for example. At 402, a command may be received to transition from a high-power mode to a low-power mode. The command may be sent by a central processing unit of the device (e.g., processor 204). At 404, the next specified edge of the low frequency clock signal may be detected. The selected edge may be set to be a rising or falling edge of the low frequency clock signal. At 406, in response to detecting the next specified edge of the low frequency clock signal, the output of the clock switching block may be switched from the high frequency clock signal to the low frequency clock signal. At 408, the high frequency clock may be blocked (e.g., by clock gate 304) from reaching the clock switching block (e.g., multiplexor 308). The components of the device may then operate using the low frequency clock signal. For instance, the device may enter a sleep mode. Moreover, the system time may be tracked by incrementing its step based on the low frequency clock period.

Figure 5:
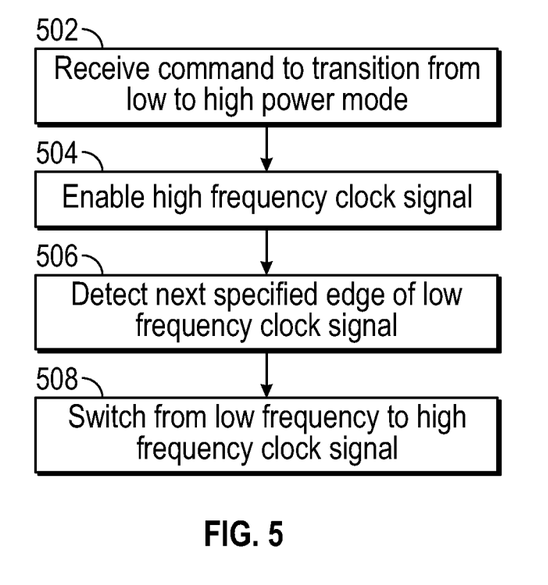
FIG. 5 is a flow diagram for transitioning from low power to high-power mode.

FIG. 5 illustrates a flow diagram of an example of portions of a method 500 for transitioning from a low-power mode to a high-power mode. The method 500 may be executed by the clock circuit 300. At 502, a command may be received to transition from a low-power mode to a low high mode. The command may be sent by a central processing unit of the device (e.g., processor 204). At 504, the high frequency clock signal may be enabled; for example, the high frequency clock signal may be permitted (e.g., by clock gate 304) to reach the clock switching block (e.g., multiplexor 308). At 506, the next specified edge of the low frequency clock signal may be detected. The selected edge may be set to be a rising or falling edge of the low frequency clock signal. At 508, in response to detecting the next specified edge of the low frequency clock signal, the output of the clock switching block may be switched from the low frequency clock signal to the high frequency clock signal. The components of the device may then operate using the high frequency clock signal. Moreover, the system time may be tracked by incrementing its step based on the high frequency clock period. In some embodiments, lower significant bits (LSBs) of a counter may be held static while the upper most significant bits (MSBs) may be incremented.

The system time may then be used to control other operations, such as scheduling communications, obtaining timestamps, etc. For example, the device may enter active mode to send and/or receive messages based on coordinated communication protocol, where communications are scheduled at specified times. In lower-power mode, the device may use the system time to obtain accurate timestamps.

By synchronizing the transition from high-to-low and low-to-high modes on the specified low frequency clock edges, timing precision is maintained. The timer-scheduler of the device may maintain timing precision of the high frequency oscillator even when the high frequency clock signal is not available in low-power modes. Thus, timing errors due to clock domain crossings may be reduced or eliminated.

Figure 6:
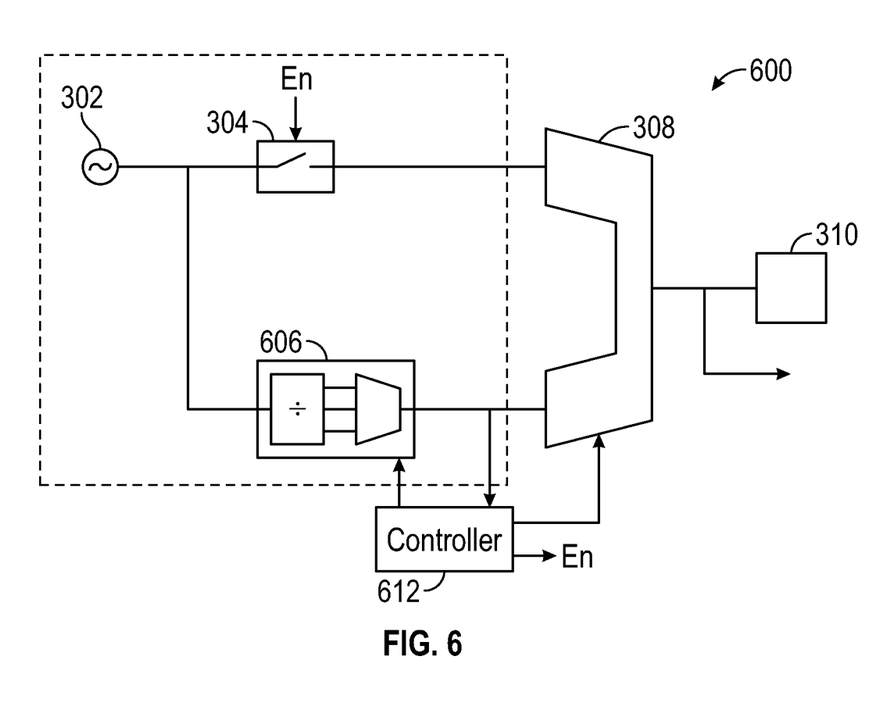
FIG. 6 illustrates a clock circuit with multiple low-power modes.

As mentioned above, a device may operate in different low-power modes. Each low-power mode may operate using a different low frequency clock signal. FIG. 6 illustrates an example of portions of a clock circuit 600 for use in a high-power mode and different low-power modes. The clock circuit 600 may include a crystal oscillator 302, a clock gate 304, a multiplexor 308, and a system time counter 310, as described above with reference to FIG. 3. The clock circuit 600 may also include a clock divider circuit 606 and controller 612 to provide the different low frequency clock signals.

The clock divider circuit 606 may include a clock divider and a second multiplexor. The clock divider circuit 606 may receive the high frequency clock signal. The clock divider in the clock divider circuit 606 may divide or scale the high frequency clock signal by different integers to generate different low frequency clock signals, and the second multiplexor may output a selected low frequency clock signal. The output of the second multiplexor may be controlled by the controller 612, The low frequency clock signals may be multiples of each other. For example, a first low frequency clock signal may be generated by dividing the high frequency clock signal by a first integer. A second low frequency clock signal may be generated by dividing the first low frequency clock signal by a second integer. The third low frequency clock signal may be generated by dividing the second low frequency clock signal by a third integer and so forth. The clock divider circuit 606 may generate low frequency clock signals that are substantially synchronous with corresponding edges of the high frequency clock signal, except for possibly a slight delay (e.g., 2-4 nanoseconds) due to the delay inherent in the circuitry of the clock divider circuit 606. The clock divider circuit 606 may also be provided spatially close to the crystal oscillator 302 to minimize wiring parasitic that may consume power.

As described above, the multiplexor 308 (also sometimes referred to as clock switching block) may receive the high frequency clock signal (e.g., from clock gate 304) and the selected low frequency clock signal (e.g., from clock divider circuit 606). The multiplexor 308 may output either the high frequency clock signal during high-power mode or the selected low frequency clock signal during low-power mode to the system time counter 310 and other components. The system time counter 310 may maintain a system time that is to be used by a timer scheduler, for example for coordinated communications as described herein. During high-power mode, the multiplexor 308 may provide the high frequency clock signal, and the system time counter 310 may use the high frequency clock signal to maintain of the system time. During each of the low-power modes, the multiplexor 308 may provide the selected low frequency clock signal, and the system time counter 310 may use the selected low frequency clock signal to maintain the system time. The different low-power modes may correspond to different levels of low operating modes (e.g., sleep mode, standby mode, hibernating mode, etc.).

The controller 612 may control selection of the low frequency clock signal and the switching of the multiplexor 308 in a synchronized fashion to maintain timing precision, as described herein (e.g., FIGS. 4 and 5). For example, during a transition from a high-power mode to a low-power mode, the controller 612 may switch the output of the multiplexor from the high frequency clock signal to the low frequency clock signal synchronized to the next specified edge of the low frequency clock. The edge for transition synchronization may be selected to be either a rising or falling edge. Likewise, during a transition from a low-power mode to a high-power mode, the controller 612 may switch the output of the multiplexor from the low frequency clock signal to the high frequency clock signal synchronized to the next specified edge of the low frequency clock. The controller 612 may be provided as a digital logic circuit.

Figure 7:
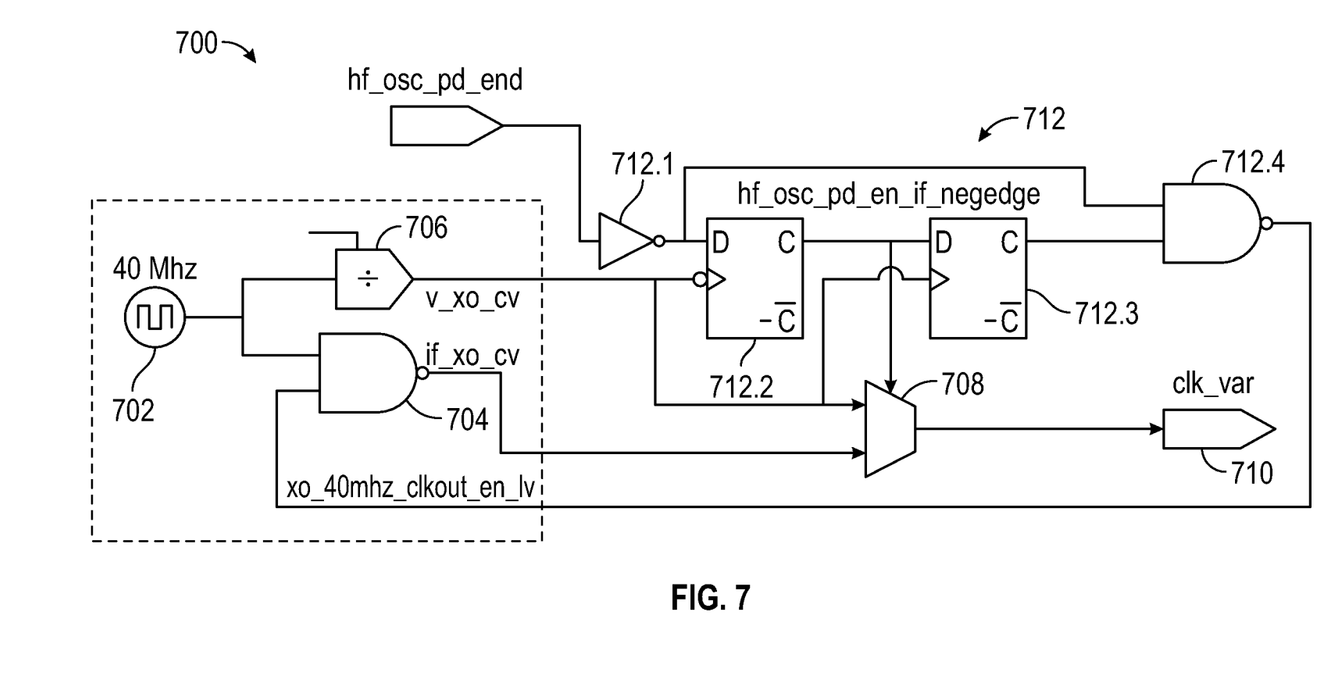
FIG. 7 illustrates a clock circuit.

The controller, as described herein, may be implemented using different configurations of logic circuits, processors, and the like. FIG. 7 illustrates an example of portions of a clock circuit 700 with a digital logic circuit configuration for the controller. The clock circuit 700 may include a crystal oscillator 702, a clock gate 704, a clock divider 706, a multiplexor 708, a system time counter 710, and a controller 712. The crystal oscillator 702 may generate a high frequency clock signal, as described herein (e.g., 302).

The clock gate 704 may receive the high frequency clock signal and may provide the high frequency clock signal (hf_xtal_clk) to the multiplexor 708 based on an enable signal (xo_40mhz_clk_out_en_lv). The clock gate 704 may be provided as a NAND gate. The controller 712 may generate the enable signal to control the clock gate 704. As described in further detail below with reference to FIGS. 8A and 8B, the clock gate 704 may provide the high frequency clock signal to the multiplexor 708 during high-power mode and may disable or block it during low-power mode(s), except for a short period of time preceding a transition from a low-power mode to a high-power mode. The clock gate 704 may be provided spatially close to the crystal oscillator 702 to minimize wiring parasitic that may consume power.

The clock divider 706 may also receive the high frequency clock signal and may divide or scale the high frequency clock signal by an integer (e.g., 400) to generate a low frequency clock signal (lf_xtal_clk). The clock divider 706 may generate a low frequency clock signal that is substantially synchronous with certain edges of the high frequency clock signal, except for possibly a slight delay (e.g., 2-4 nanoseconds) due to the delay inherent in the circuitry of the clock divider 706. The clock divider 706 may also be provided spatially close to the crystal oscillator 702 to minimize wiring parasitic that may consume power.

The multiplexor 708 (or clock switching block) may receive the high frequency clock signal (e.g., from clock gate 704) and the low frequency clock signal (e.g., from clock divider 706). The multiplexor 708 may output either the high frequency clock signal during high-power mode or the low frequency clock signal during low-power mode to the system time counter 710 and other components. The system time counter 710 may maintain a system time that is to be used by a timer scheduler, for example for coordinated communications as described herein. During high-power mode, the multiplexor 708 may provide the high frequency clock signal, and the system time counter 710 may use the high frequency clock to maintain the system time. During low-power mode, the multiplexor 708 may provide the low frequency clock signal, and the system time counter 710 may use the low frequency clock to maintain the system time. Low-power mode may correspond to a sleep mode.

The controller 712 may control the switching of the multiplexor 708 in a synchronized fashion to maintain timing precision. The controller 712 may include a NOT gate 712.1, a first D flip-flop 712.2, a second D flip-flop 712.3, and a NAND gate 712.4. The NOT gate 712.1 may invert a hf_osc_pd_enb signal, which may be indicative of a command for whether the device is in high or low-power mode; the output of the NOT gate 712.2 may be provided as an input to the first D flip-flop 712.2 and the NAND gate 712.4. The low frequency clock signal (lf_xtal_clk) may also be provided as an input into the first D 712.3. The output of the first D flip-flop (hf_osc_pd_en_lf_negedge) may control the switching of the multiplexor 708. The output of the multiplexor is represented by clk_var. In this example, the switching between the different modes is conducted on the falling (negative) edge of the low frequency clock signal, as described herein. The second flip-flop 712.3, which may receive the output of the first D flip-flop 712.2 and the low frequency clock (lf_xtal_clk), and the NAND gate 712.4 may generate the enable signal for controlling the clock gate 706.

Figure 8A:
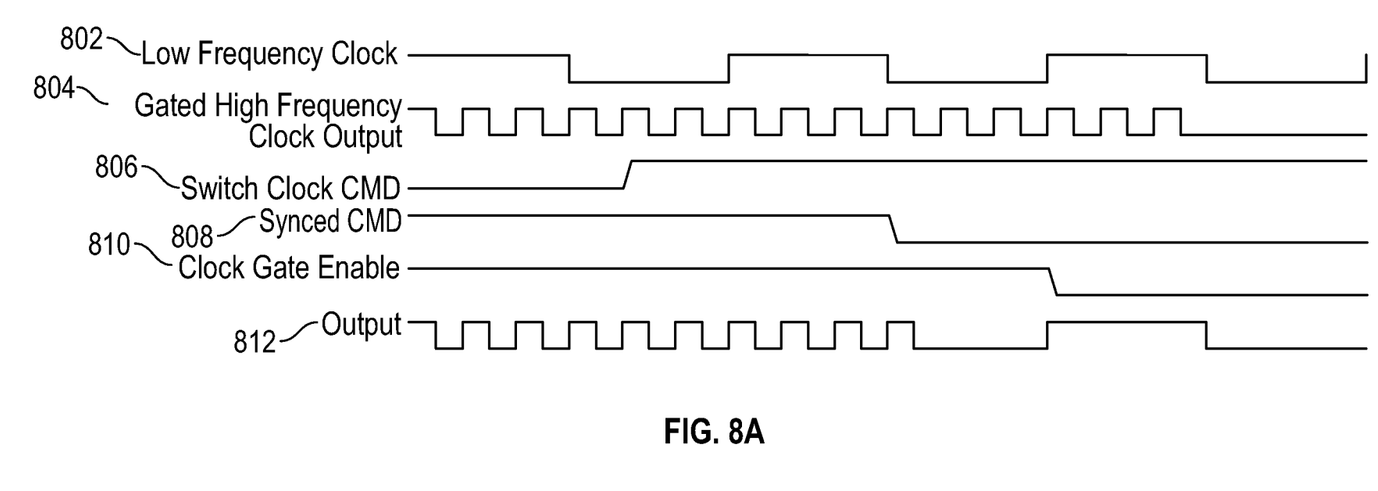
FIG. 8A illustrates a timing diagram for a transition from high-power mode to low-power mode.

FIG. 8A is a timing diagram illustrating a transition from a high-power mode to a low-power mode for a clock circuit as described herein. For example, the timing diagram may illustrate the operations of the clock circuit 300 of FIG. 3 during a transition from a high-power mode to a low-power mode. The timing diagram shows a low frequency clock 802, which may be the output of the clock divider 306; a gated high frequency clock output 804, which may be the output of the clock gate 304; a switch clock command 806; a synced command 808, which may represent a command to switch clocks synchronized to a falling edge of the low frequency clock; an enable command 810 for the clock gate 304; and an output 812, which may be the output of the multiplexor 308. As shown and discussed above, the transition from the high-power mode to low-power mode is made on a falling edge of the low frequency clock. That is, the transition is made on the subsequent falling edge of the low frequency clock 802) after the command for going to low-power mode is received (806). Moreover, after the transition, the clock gate 810 may disable the high frequency clock signal (804).

Figure 8B:
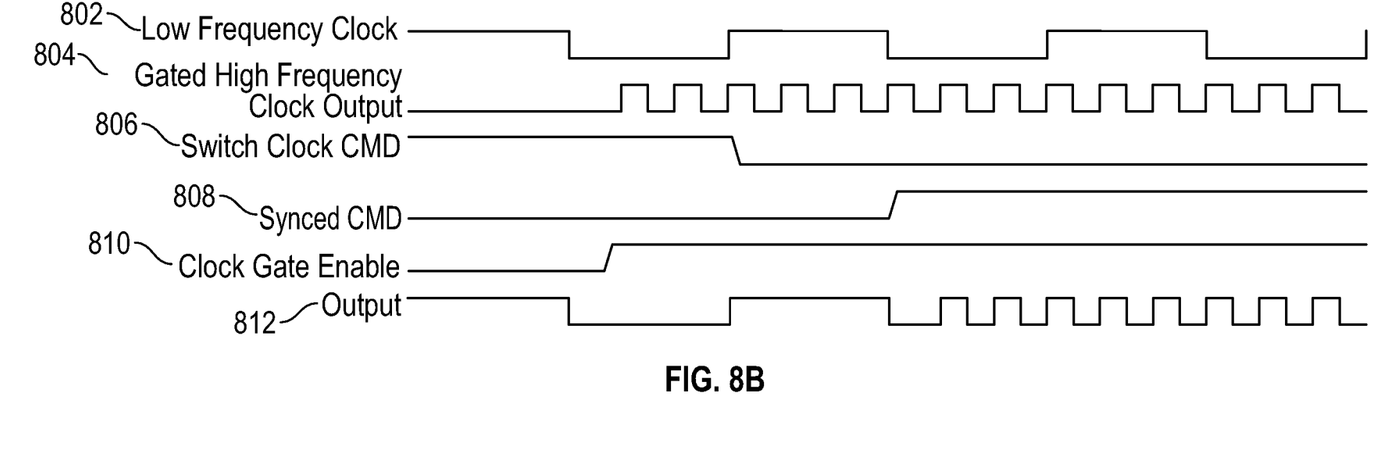
FIG. 8B illustrates a timing diagram for a transition from low-power mode to high-power mode.

FIG. 8B is a timing diagram illustrating a transition from a low-power mode to a high-power mode for a clock circuit as described herein. For example, the timing diagram may illustrate the operations of the clock circuit 300 of FIG. 3 during a transition from a low-power mode to a high-power mode. As shown and discussed above, the transition from the law-power mode to high-power mode is made on a falling edge of the low frequency clock. That is, the transition is made on the subsequent falling edge of the low frequency clock (802) after the command for going to high power is received (806). Moreover, before the transition, the clock gate 810 may enable the high frequency clock signal (804).

Several embodiments are specifically illustrated and/or described herein. However, it will be appreciated that modifications and variations of the invention are covered by the above teachings and within the purview of the appended aspects without departing from the intended scope of the invention.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended aspects, along with the full range of equivalents to which such aspects are entitled.

The invention claimed is:

1. A clock circuit comprising:
   a clock to generate a first clock signal having a first frequency;
   a clock divider to divide the first clock signal to generate a second clock signal output at a second frequency, wherein the first frequency is higher than the second frequency;
   a multiplexor to receive the first and second clock signals as inputs;
   a controller coupled to the multiplexor to control the multiplexor to output the first clock signal during a first mode and to output the second clock signal during a second mode, wherein switching directly between the first clock signal and second clock signal by the multiplexor is performed based on a select edge of the second clock signal; and
   a system time counter coupled to the multiplexor to maintain a system time count, wherein the system counter configured to increment the system time count based on the first clock signal during the first mode and to increment the system time count based on the second clock signal during the second mode.

2. The clock circuit of claim 1, wherein in response to a command to switch from the first mode to the second mode, the controller is configured to switch the multiplexor output from the first clock signal to the second clock signal at the select edge of the second clock signal.

3. The clock circuit of claim 1, wherein in response to a command to switch from the second mode to the first mode, the controller is configured to switch the multiplexor output from the second clock signal to the first clock signal at the select edge of the second clock signal.

4. The clock circuit of claim 1, further including:
   a clock gate coupled to the first clock signal output to connect and disconnect the first clock signal to the multiplexor.

5. The clock circuit of claim 4,
   wherein the clock gate and the divider are located spatially close to the clock, wherein the clock includes a crystal oscillator.

6. The clock circuit of claim 1, wherein the clock divider is configured to generate a plurality of second clock signals, each second clock signal oscillating at a different frequency.

7. A method to maintain timing between different modes, the method comprising:
   receiving a command to switch from a first power mode to a second power mode;
   in response to receiving the command, detecting a next specified edge of a low frequency clock signal of a set of clock signals;
   switching directly to a clock signal corresponding to the second power mode at the detected edge of the low frequency clock;
   maintaining a system time count based on a second clock signal corresponding to the first power mode; and
   in response to switching to the clock signal corresponding to the second power mode, maintaining the system time count based on the clock signal corresponding to the second power mode.

8. The method of claim 7, wherein the first power mode is a high-power mode, the second power mode is a low-power mode, and the clock signal corresponding to the second power mode is the low frequency clock signal.

9. The method of claim 8, further comprising:
   in response to switching to the clock signal corresponding to the second power mode, blocking a second clock signal corresponding to the first power mode.

10. The method of claim 7, wherein the first mode is a low-power mode, the second power mode is a high-power mode, and the clock signal corresponding to the second power is a high frequency clock signal.

11. The method of claim 10, further comprising:
    prior to switching to the clock signal corresponding to the second power mode, enabling the high frequency clock signal.

12. The method of claim 10, further comprising:
    using the high frequency clock signal to generate the low frequency clock signal.

13. A device to maintain timing between modes, the device comprising:
    a radio interface to communicate with another device; and,
    a clock circuit, comprising:
    a clock to generate a first clock signal having a first frequency;
    a clock divider to divide the first clock signal to generate a second clock signal at a second frequency, wherein the first frequency is higher than the second frequency;
    a multiplexor to receive the first and second clock signals as inputs; and
    a controller coupled to multiplexor to control the multiplexor to output the first clock signal during a first mode and to output the second clock signal during a second mode, wherein switching directly between the first clock signal and second clock signal by the multiplexor is performed based on a select edge of the second clock signal; and
    a system time counter coupled to the multiplexor to maintain a system time count, wherein the system counter configured to increment the system time count based on the first clock signal during the first mode and to increment the system time count based on the second clock signal during the second mode.

14. The device of claim 13, wherein in response to a command to switch from the first mode to the second mode, the controller is configured to switch the multiplexor output from the first clock signal to the second clock signal at the select edge of the second clock signal.

15. The device of claim 13, wherein in response to a command to switch from the second mode to the first mode, the controller is configured to switch the multiplexor output from the second clock signal to the first clock signal at the select edge of the second clock signal.

16. The device of claim 13, further comprising
    a clock gate coupled to the clock to connect and disconnect the first clock signal to the multiplexor.

* * * * *

UNITED STATES PATENT AND TRADEMARK OFFICE
CERTIFICATE OF CORRECTION

PATENT NO. : 11,895,588 B2
APPLICATION NO. : 17/385536
DATED : February 6, 2024
INVENTOR(S) : Warneke et al.

Page 1 of 1

It is certified that error appears in the above-identified patent and that said Letters Patent is hereby corrected as shown below:

In the Claims

In Column 10, Line 32, in Claim 13, after "inputs;", delete "and"

Signed and Sealed this
Eighth Day of April, 2025

Coke Morgan Stewart
*Acting Director of the United States Patent and Trademark Office*